United States Patent
Shaffer et al.

(10) Patent No.: US 9,237,234 B2
(45) Date of Patent: Jan. 12, 2016

(54) SYSTEM AND METHOD FOR MODIFYING PARAMETERS IN A CONTACT CENTER

(71) Applicant: Avaya Inc., Basking Ridge, NJ (US)

(72) Inventors: Shmuel Shaffer, Palo Alto, CA (US); Tony McCormack, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 306 days.

(21) Appl. No.: 13/924,669

(22) Filed: Jun. 24, 2013

(65) Prior Publication Data
US 2014/0376709 A1    Dec. 25, 2014

(51) Int. Cl.
H04M 3/00 (2006.01)
H04M 5/00 (2006.01)
H04M 3/51 (2006.01)
H04M 3/523 (2006.01)

(52) U.S. Cl.
CPC .......... *H04M 3/5175* (2013.01); *H04M 3/5232* (2013.01); *H04M 2203/401* (2013.01)

(58) Field of Classification Search
USPC ................ 379/265.06, 265.01, 309
See application file for complete search history.

(56) References Cited

U.S. PATENT DOCUMENTS

| | | | |
|---|---|---|---|
| 6,741,698 B1 * | 5/2004 | Jensen | 379/265.02 |
| 2005/0169452 A1 * | 8/2005 | Prigogin et al. | 379/265.01 |
| 2008/0002823 A1 * | 1/2008 | Fama et al. | 379/265.12 |
| 2008/0098486 A1 * | 4/2008 | Lin et al. | 726/27 |

* cited by examiner

*Primary Examiner* — Quynh Nguyen

(57) ABSTRACT

A parameters modification system for a contact center is provided. The parameters modification system includes an input module for enabling a user to provide an input indicating one or more parameters required to be modified. The parameters modification system further includes a determination module for determining a surface based on key performance indicators (KPIs) associated the one more parameters. The determination module further determines an optimal path in the determined surface. The parameters modification system further includes a modification module for modifying the one or more parameters along the determined optimal path so that key performance indicators associated with the one or more parameters remain within a predetermined threshold.

20 Claims, 4 Drawing Sheets

SYSTEM AND METHOD FOR MODIFYING PARAMETERS IN A CONTACT CENTER

BACKGROUND

1. Field of the Invention

Embodiments of the present invention provide a system and a method for modifying operations of a contact center to meet a business requirement. More particularly, embodiments of the present invention provide a system and a method for modifying parameters of a contact center.

2. Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., interactive voice response (IVR) units), in order to service the incoming contacts.

Contact centers distribute inbound and/or outbound contacts for servicing to any suitable resource according to pre-defined criteria. In many existing systems, the criteria for servicing the contact from the moment the contact center becomes aware of the contact until the contact is connected to an agent are client or operator-specifiable (i.e., programmable by the operator of the contact center) via a capability called vectoring. Normally, in present-day automatic call distribution (ACD) when the ACD system's controller detects an agent has become available to handle a contact, the controller identifies all predefined contact-handling pool for the agent, usually in some order of priority and delivers to the agent the highest-priority, oldest contact that matches the agent's highest-priority pool. Generally, the only condition that results in a contact not being delivered to an available agent is where there are no contacts waiting to be handled.

Agents are typically associated with a specific communication manager (CM) and automatic call distribution (ACD) such as contact center (CC) Elite. Further, the contact center employs both in-house agents and outsourcers. The contact center may outsource a certain percentage of calls (e.g., 10 percent) to the outsourcers due to cost reasons or language reasons. The contact center may have a specific agreement with the outsourcer. For example, the contact center will outsource 10 percent of calls to the outsourcers provided the outsourcer answers those calls within 20 seconds, and if the outsourcer does not answer those calls within 20 seconds, the contact center may punish the outsourcers by reducing the percentage of calls outsourced to the outsourcer by 3 percent.

Typically, supervisors manage key performance indicators (KPIs) such as wait time. Supervisors may manage the percentage of calls assigned to be handled by the in-house agents and by the various outsourcers. At times due to business reasons as explained above (e.g., when the outsourcer does not meet service level agreement requirement), a supervisor may need to change the percentage of calls directed to a specific outsourcer. For example, supervisors may need to reduce the percentage of calls directed to a specific outsourcer from 20 percent to 15 percent. Consequently the percentage of calls directed to other agent pools would increase. To avoid adverse impact to service level agreements (SLAs), other parameters may need to be modified to ensure that the SLA remains within proper limits. For example, agent skills or number of agents assigned to a specific region may need to be modified.

However, conventional technique of bulk changing of parameters may cause large swings in one or more KPIs and cause a specific SLA to drop below accepted threshold. This is due to that fact that the contact center is a multi-variable system with n1 inputs (e.g., specific attributes of agents, number of calls requiring specific skill set, number of agents with specific attribute, etc.) and n2 outputs (e.g., various KPIs such as average wait time, total revenue, number of calls resolving issue in first time, etc.). For example, a four dimensional system may have two KPIs wherein $KPI1=f(x,y)$, and $KPI2=f(x,y)$ where x and y are attributes that the supervisor can change. Presently, if the supervisor first changes x (e.g., the percentage of calls directed to a specific outsourcer) then KPI1 would improve but KPI2 may drop below threshold. Alternatively, if the supervisor first changes y (e.g., the number of agents with a specific skill) then KPI2 would improve but KPI1 may drop below threshold. Hence, neither path provides an optimal route because in either case one of the KPIs may drop below acceptable threshold. Further, the supervisor can change only one parameter at one time, causing bulk changes in the value of parameter. However, bulk change of parameters may cause large swings in specific KPI and cause a specific SLA to drop below accepted threshold.

Therefore, there is a need for a system and method that is capable of modifying parameters so that none of the KPIs drop below the acceptable threshold.

SUMMARY

Embodiments in accordance with the present invention provide a parameters modification system for a contact center. The parameters modification system includes an input module for enabling a user to provide an input indicating one or more parameters (e.g., N parameters) required to be modified. The parameters modification system further includes a determination module for determining a surface based on key performance indicators (KPIs) associated with the one or more parameters. The determination module further determines an optimal path in the determined surface. The parameters modification system further includes a modification module for modifying the one or more parameters along the determined optimal path so that key performance indicators (KPIs) associated with the one or more parameters remain within a predetermined threshold.

Embodiments in accordance with the present invention further provide a computer-implemented method for modifying parameters in a contact center. The computer-implemented method includes receiving from a user one or more parameters required to be modified. The computer-implemented method further includes computing a surface based on key performance indicators (KPIs) associated with the one or more parameters and further determining an optimal path in determined the surface. The computer-implemented method further includes modifying the one or more parameters along the determined optimal path.

Embodiments in accordance with the present invention further provide a computer readable medium storing computer readable instructions when executed by a processor performs a method. The method includes receiving one or more parameters required to be modified from a user, computing a surface based on key performance indicators (KPIs) associated with the one or more parameters, determining an optimal path in the determined surface, and modifying the one or more parameters along the determined optimal path.

Further, the present invention can provide a number of advantages depending on its particular configuration. First, embodiments of the present invention provide a system and a method for optimal path selection for parameters/attributes modification in a contact center. Second, embodiments of the present invention provides system and method for automated mechanism to achieve goal of optimizing path from a location of poor performance with respect to multiple KPIs, to a status of satisfactory performance with respect to multiple KPIs. Moreover, embodiments of the present invention provide an alert to the supervisor that at least one KPI may go outside a predetermined threshold based upon a modification of a parameter by the user. Furthermore, embodiments of the present invention provide an alternative path to the user for simultaneously modifying two parameters and also keeping all of the KPIs within the predetermined threshold.

These and other advantages will be apparent from the disclosure of the present invention contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible, utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

Figure 1:
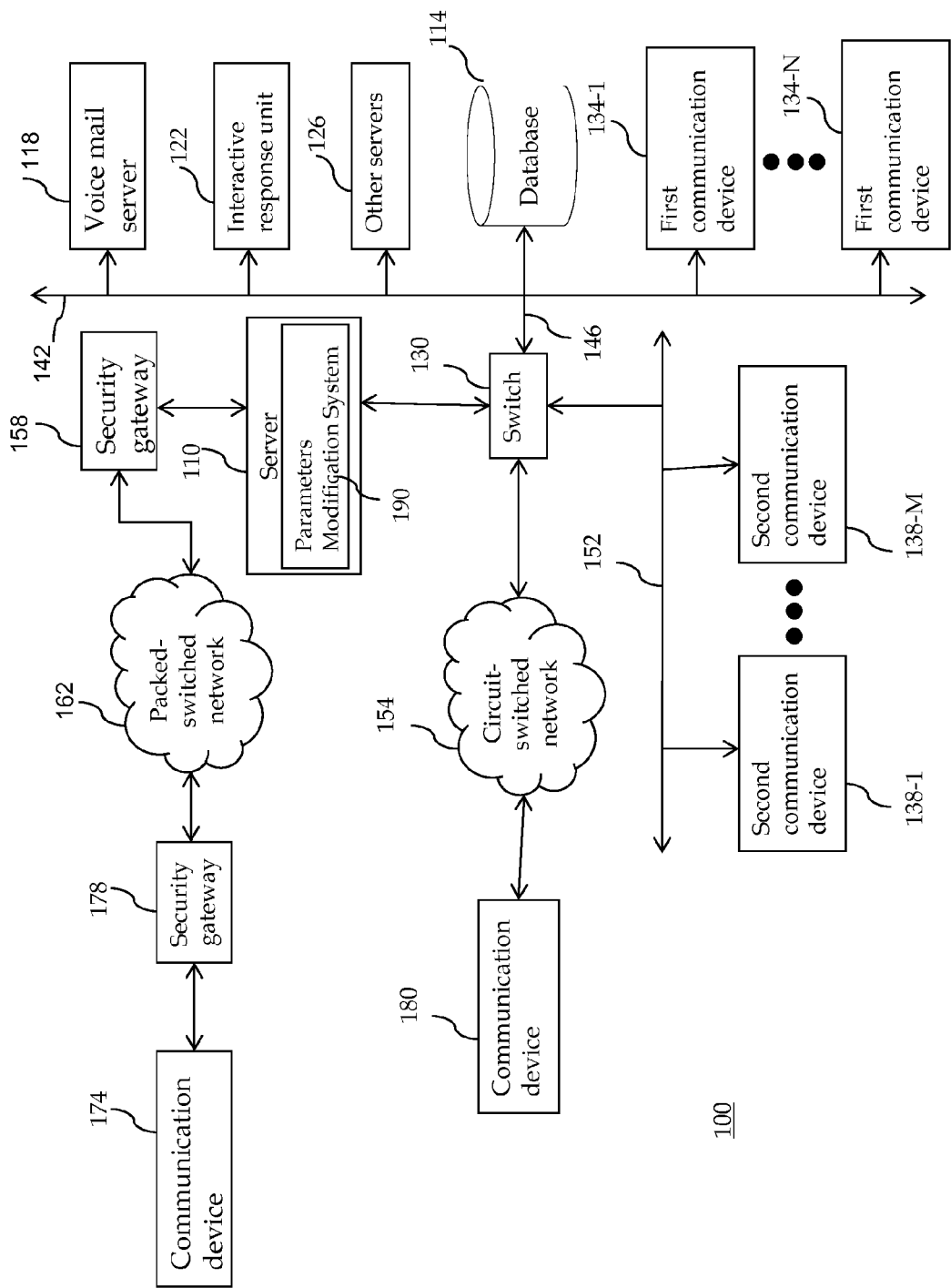
FIG. 1 is a block diagram depicting a contact center according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., the Avaya Aura® system. Although well suited for use with, e.g., a system having an automatic call distribution (ACD) or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a private branch exchange (PBX), an automatic call distribution (ACD), an enterprise switch, or other type of communications system switch or server, as well as other types of processor-based communication control devices such as media servers, computers, adjuncts, etc.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Response unit (e.g., IVR) 122, and other servers 126, a switch 130, a plurality of working agents operating packet-switched communication devices 134-1 to N (e.g., computer work stations or personal computers), and/or circuit-switched communication devices 138-1 to M, all interconnected by a local area network LAN or wide area network WAN 142. The servers can be connected via optional communication lines 146 to the switch 130. As will be appreciated, the other servers 126 can also include a scanner, which normally may not be connected to the switch 130 or Web server, VoIP software, video call software, voice messaging software, an IP voice server, a fax server, a web server, an email server, and the like. The other servers 126 further include servers to receive textual contacts e.g., emails, web chats, social media chats, and instant messages. The switch 130 is connected via a plurality of trunks 150 to the Public Switch Telephone Network or PSTN 154 and via link(s) 152 to the second communication devices 138-1 to M. A gateway 158 is positioned between the server 110 and the packet-switched network 162 to process communications passing between the server 110 and the network 162.

Although the embodiment is discussed above with reference to client-server architecture, it is to be understood that the principles of the present invention apply to other network architectures. For example, the present invention applies to peer-to-peer networks. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the present invention does not require the presence of packet- or circuit-switched networks. The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc.

In an embodiment, the gateway 158 shown in FIG. 1 can be Avaya Inc.'s, G700 Media Gateway™ and may be implemented as hardware such as an adjunct processor, a chip in the server, etc.

The first communication devices 134-1 . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1 . . . 138-M are circuit-switched. Each of the communication devices 138-1 . . . 138-M corresponds to one of a set of internal extensions Ext1 . . . ExtM, respectively. The second communication devices can include, for example, wired and wireless telephones, PDAs, H.320 videophones and conferencing units, voice messaging and response units, traditional computer telephony adjuncts, and any other communication device.

It should be noted that the present invention does not require any particular type of information transport medium between switch or server and first and second communication devices, i.e., the present invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with a first communication device 174 via a gateway 178, and the circuit-switched network 154 with an external second communication device 180.

In another configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the present invention to any particular arrangement of elements.

Figure 2:
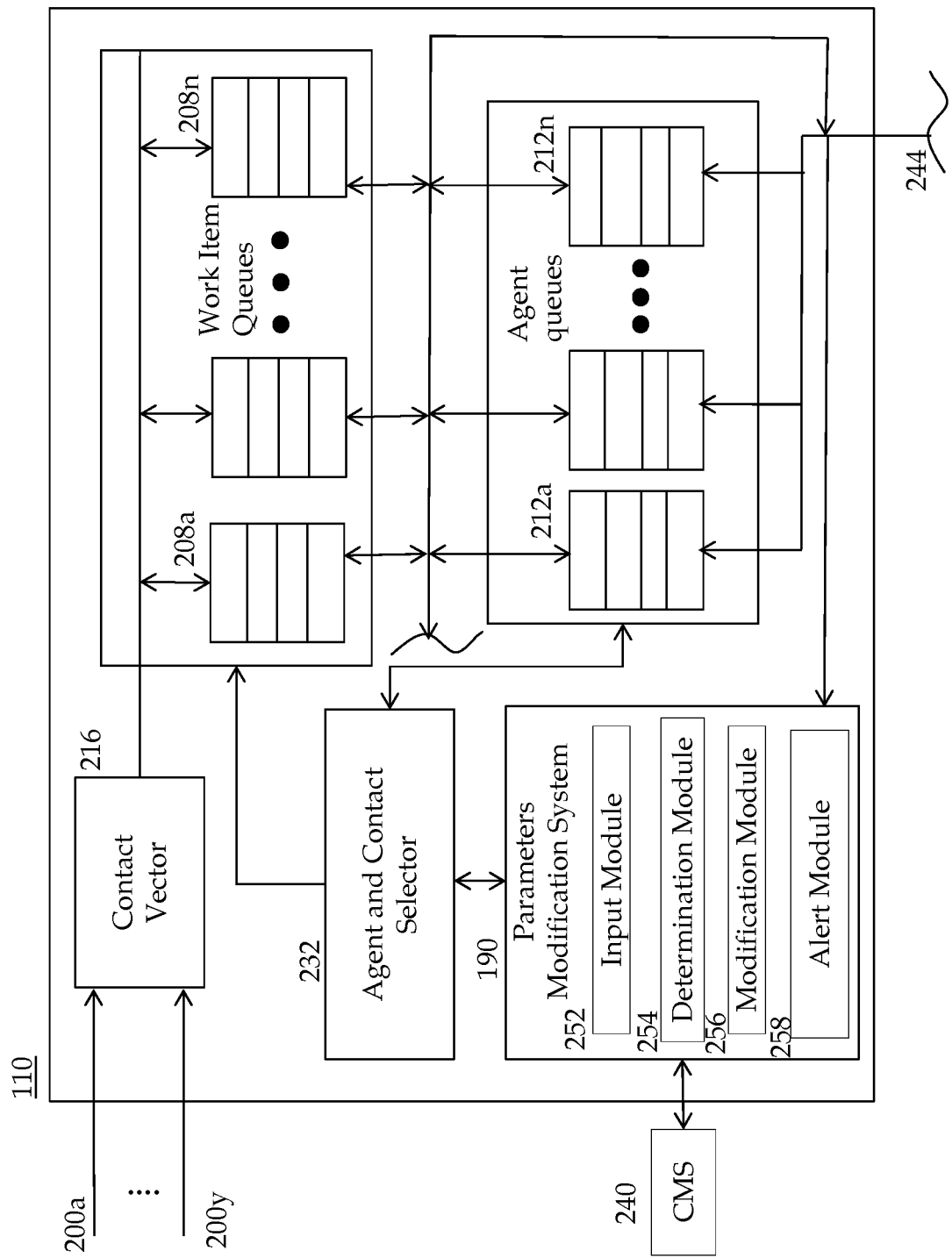
FIG. 2 is a block diagram of a server according to an embodiment of the present invention.

Further, as shown in FIG. 1, the contact center comprises the server 110, configuration of which is explained further in conjunction with FIG. 2 of the present invention. The server 110 further comprises a parameters modification system 190 as an embodiment of the present invention. The detailed configuration of the parameters modification system 190 is also explained further in conjunction with FIG. 2 of the present invention.

In an exemplary embodiment, the parameters modification system 190 is configured to monitor predetermined operation statistics of the contact center. The predetermined operation statistics of the contact center 100 may include, various key performance indicators (KPIs) including, but not limited to, agent responsiveness time for new work requests, average handling time of work requests, target revenue of sales team and so forth. Each of the KPIs has a predetermined acceptable threshold and according to a service level agreement, none of the KPIs should drop below the predetermined acceptable threshold. Further, the parameters modification system 190 may also monitor call traffic that may include, but is not restricted to, telephone calls, web chats, audio messages, video messages, text messages, postings to social media sites, and postings to blog sites. In an embodiment, one or more software bots may be configured to detect postings to social media sites and blog sites that are related to services provided by the contact center. The software bots may further be configured to share related media postings with the parameters modification system 190 and with the supervisor of the contact center.

According to an embodiment of the present invention, the parameters modification system 190 is further configured to automatically trigger modifications of parameters of the contact center if the parameters modification system 190 detects any unusual behavior of the contact center based on historical data. The unusual behavior may include higher agent responsiveness time for new work requests, higher average handling time of work requests, lower revenue of sales team, or a KPI going outside the acceptable threshold.

According to another embodiment of the present invention, the parameters modification system 190 is further configured to enable a user to provide one or more parameters (e.g., N parameters) that are required to be modified. Further, according to an embodiment of the present invention, the parameters modification system 190 is configured to determine an optimal path for simultaneously modifying the one or more parameters so that none of the KPIs drop below a predetermined threshold.

According to yet another embodiment of the present invention, the parameters modification system 190 is also configured to alert the user that at least one KPI may go outside a predetermined threshold, if the user tries to manually modify a parameter. The parameters modification system 190 may further provide an alternative path to the user for modifying the parameter so that KPIs associated with the parameter remain within the predetermined threshold.

The parameters modification system 190 may further have access to the database 114, having stored therein personal and professional details of all the employees of the contact center. In addition, the parameters modification system 190 may be configured to update the skills level of the agents.

Referring to FIG. 2, one possible configuration of the server 110 is depicted. The server 110 is in communication with a plurality of customer communication lines 200a-y, which can be one or more trunks, phone lines, etc., and agent communication line 240, which can be a voice-and-data transmission line such as LAN 142, as shown in FIG. 1, and/or a circuit switched voice line. The server 110 can include an operational contact center reporting module (not shown), such as Avaya IQ™, reporting application, e.g., CMS™, Basic Call Management System™, Operational Analyst™, and Customer Call Routing or CCR™ by Avaya, Inc., gathers call records and contact-center statistics for use in generating contact-center reports.

The switch 130 and/or server 110 can be any architecture for directing contacts to one or more communication devices. In some embodiments, the switch 130 may perform load-balancing functions by allocating incoming or outgoing contacts among a plurality of logically and/or geographically distinct contact centers. Illustratively, the switch and/or server can be a modified form of the subscriber-premises equipment sold by Avaya Inc. under the names Definity™ Private-Branch Exchange (PBX)-based ACD system, Multi-Vantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

Moreover, as shown in FIG. 2, among the data stored in the server 110 is a set of contact pools 208a-n and a separate set of agent pools 212a-n. Each contact pool 208a-n corresponds to a different set of agent pool, as does each agent pool 212a-n. Conventionally, contacts are prioritized and are either enqueued in individual ones of the contact pools 208a-n in their order of priority, or are enqueued in different ones of a plurality of contact pools that correspond to a different priority. Likewise, each agent's pools are prioritized according to his or her level of expertise or skill in that pool, and either agents are enqueued in individual ones of agent pools 212a-n in their order of expertise level or are enqueued in different ones of a plurality of agent pools 212a-n that correspond to a pool and each one of which corresponds to a different expertise level. Further, in addition to in-house agents pools 212a-n, the contact center 100 may employ a plurality of outsourcers (not shown in the figure) to handle calls. The contact center 100 may direct some percentage of calls (e.g., 10 percent, according to a service level agreement between the contact center and the outsourcer) to the outsourcers.

Included among the control programs in the server 110 is a contact workflow, e.g., vector 216 that controls work item routing process. Contacts incoming to the contact center are assigned by the vector 216 to different contact pools 208a-n based upon a number of predetermined criteria, including customer identity, customer needs, contact center needs, current contact center pool lengths, customer value, and the agent skill that is required for the proper handling of the contact. Agents who are available for handling contacts are assigned to agent pools 212a-n based upon the skills that they possess. An agent may have multiple skills, and hence may be assigned to multiple agent pools 212a-n simultaneously. Furthermore, an agent may have different levels of skill expertise (e.g., skill levels 1-N in one configuration or merely primary skill levels and secondary skill levels in another configuration), and hence may be assigned to different agent pools 212a-n at different expertise levels.

In one configuration, the contact center is operated by a contract operator, and each of the contact pools 208a-n, and possibly each of the agent pools 212a-n, corresponds to a different client. Each client can have a separate service level agreement or other type of performance measurement agreement with the contract operator regarding performance expectations, goals, requirements or specifications for the client's respective pool(s). The service level agreement can set forth penalties, such as financial penalties, for failing to comply with the service level agreement's requirements.

According to at least one embodiment, an agent and contact selector 232 (hereinafter, "selector 232") is provided. The selector 232 and the parameters modification system 190 are embodied in the server 110. Further, the selector 232 monitors the occupants of the work item and pools 208a-n and 212a-n, respectively, and contact center objectives, rules, and policies and assigns agents to service work items. As will be appreciated, the central server 110 is notified via LAN 142 of an incoming contact by the communications component (e.g., switch 130, fax server, email server, web server, and/or other server) receiving the incoming contact. The incoming contact is held by the receiving communications component until the selector 232 forwards instructions to the component to forward or route the contact to a specific contact center resource, such as the interactive response unit 122, the voice mail server 118, and/or first or second communication device 134, 138 associated with a selected agent. The selector 232 distributes and connects these contacts to communication devices of available agents based on the predetermined criteria noted above. When the selector 232 forwards a voice contact to an agent, the selector 232 also forwards customer-related information from databases 114 to the agent's computer work station for previewing and/or viewing, such as by a pop-up display, to permit the agent to better serve the customer. The agents process the contacts sent to them by the selector 232.

The parameters modification system 190, as shown in FIG. 2, includes certain modules, such as, but not restricted to, input module 252, determination module 254, modification module 256, and alert module 258.

The input module 252 is configured to enable a user to provide input. The input from the user may indicate one or more parameters (e.g., N parameters) of the contact center that are required to be modified due to some business reasons. The parameters may include, but not limited to, specific attributes of agents, number of calls requiring specific skill set, number of agents with specific attribute, etc. Further, change of a parameter may affect one or more KPIs associated with the service level agreement, as each KPI is a function of one more parameters. The KPIs may include, but not limited to, average wait time, total revenue, number of calls resolving issue in first call, etc. For example, a particular KPI may be a function of two parameters, and similarly another KPI may be function of same two parameters. If the user changes one parameter to meet a particular KPI, the other KPI may very too much (as this will also change due to change of the parameter) and can even go outside a predetermined acceptable threshold. In an embodiment of the present invention, the first parameter may be a percentage of calls directed to an outsourcer or a specific agent pool, and the second parameter may be number of agents having a particular skillset.

In an embodiment of the present invention, the user is a supervisor. In another embodiment of the present invention, the user may be a manager or any other person from management who is responsible for managing KPIs of the contact center.

Further, as discussed above, each KPI has a predetermined acceptable threshold, and is function of one or more parameters. Further, each parameter has a predetermined range so that none of KPIs drop below the acceptable threshold due to change of the parameter inside the predetermined range. In an embodiment of the present invention, the predetermined range may be automatically decided by the contact center based on required compliance of KPIs mentioned in service level agreement. The predetermined ranges of the parameters may be decided by the contact center, wherein performance of various KPIs is at optimum level. In another embodiment of the present invention, the predetermined range may be provided manually by the user. For example, sometimes, the user may decide to change the parameters outside the predetermined ranges due to some business reasons.

The determination module 254 is configured to compute a surface based on key performance indicators associated with the one or more parameters. In an embodiment of the present invention, each parameter may be associated with a predetermined range that specifies a range of values within which the parameter can be changed. The predetermined range of a parameter may include a minimum value and a maximum value of the parameter. Further, the predetermined range of one parameter (e.g., first parameter) may be different than another parameter (e.g., second parameter).

Figure 3:
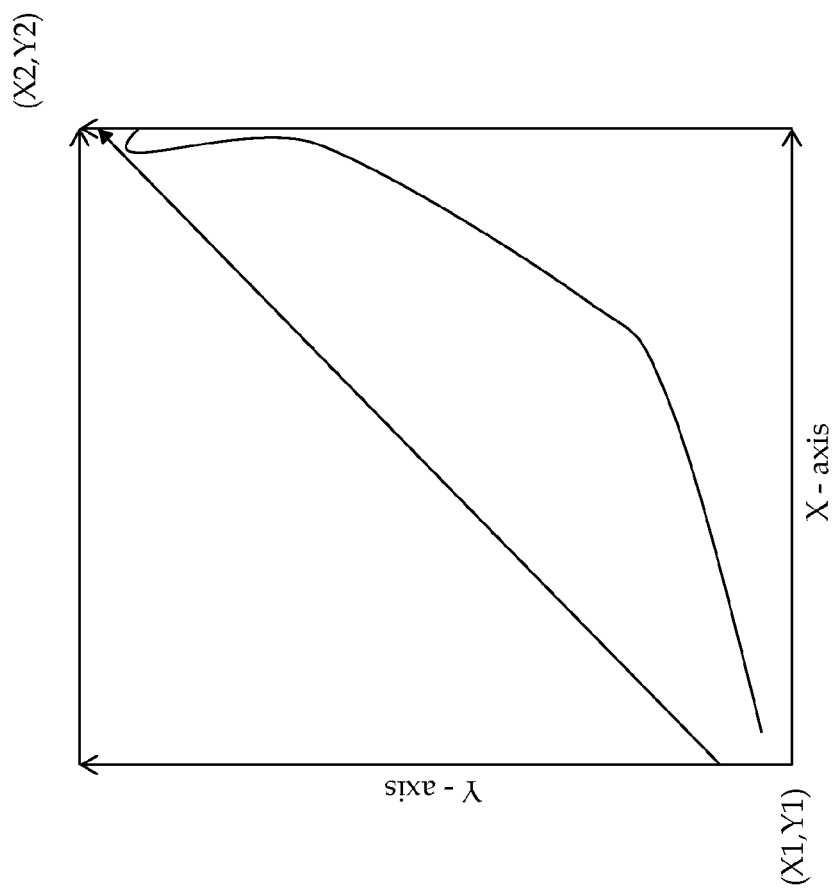
FIG. 3 is a graph showing optimal paths for modifying two parameters, in accordance with an embodiment of the present invention.

For example, the user has provided input to change only two parameters (i.e., a first parameter and a second parameter). In an embodiment, the first parameter is percentage of calls directed to a specific outsourcer, and the second parameter is number of agents with a specific skill. Further, the predetermined range of a first parameter is 'X1', 'X2' and the predetermined range of second parameter is 'Y1', 'Y2'. Hence, minimum value of the first parameter is 'X1' and maximum value of the first parameter is 'X2'. Similarly, minimum value of the second parameter is 'Y1' and maximum value of the second parameter is 'Y2'. The determination module 254 may draw a graph on X-Y axis, as shown in FIG. 3. First, the determination module 254 may identify first point (i.e., X1,Y1) in the graph based on minimum vales of X and Y. Then, the determination module 254 may identify second point (i.e., X2, Y2) in the graph based on maximum values of X and Y. The determination module 254 may further mark the surface under 'X1', 'Y1' and 'X2', 'Y2' by first changing the 'X1' to 'X2' and 'Y1' to 'Y2', and then changing first 'Y1' to 'Y2' and 'X1' to 'X2'.

The determination module 254 is further configured to determine an optimal path in the determined surface to change the one or more parameters so that all KPIs associated with the one or more parameters remain within the threshold. In an embodiment of the present invention, the optimal path may provide options for the user to change the one or more parameters so that KPIs associated with the one or more parameters is within predetermined threshold. In an embodiment of the present invention, the optimal path is a straight line connecting minimum values of the first parameter and the second parameter, with maximum values of the first parameter and the second parameter. In another embodiment of the present invention, the optimal path is a curved line in the determined surface, as shown in FIG. 3.

If the user wants to change the first parameter and the second parameter, the determination module 254 may provide an alternative path to the user for modifying the first parameter and the second parameter so that the first KPI and the second KPI remain within the predetermined threshold.

The modification module 256 is configured to modify the one or more parameters (e.g., N parameters) along the determined optimal path. The modification module 256 modifies the one more parameters along the optimal path. The modification module 256 is configured to simultaneously modify the one or more parameters (e.g., the first parameter and the second parameter) along the optimal path so that there is no bulk change in value of one parameter and KPIs associated with the one or more parameters remain within the predetermined acceptable threshold. For example, the first KPI and the second KPI associated with the first parameter and the second parameter remain within a predetermined threshold based upon the modification of the first parameter and the second parameter along the optimal path.

The modification module 256 is further configured to automatically triggering the modifications of the one or more parameters along the optimal path based upon predefined operating conditions. The predefined operating conditions may include higher agent responsiveness time for new work requests, higher average handling time of work requests, lower revenue of sales team, or one of KPI going outside the acceptable threshold.

In an embodiment of the present invention, the modification module 256 automatically modifies the one or more parameters along the optimal path. In another embodiment of the present invention, the modification module 256 sends a request to the supervisor for approving the changes. If the supervisor approves the changes, the modification module 256 modifies the one or more parameters (e.g., the first parameter and the second parameter). Otherwise, the first parameter and the second parameter remain same.

The alert module 258 is configured to alert the user about unusual current behavior of at least one KPI based upon historical data. Further, according to an embodiment of the present invention, if the user wants to modify a parameter such that at least one KPI may go outside a predetermined threshold, the alert module 258 is configured to alert the user to that possibility. Furthermore, the alert module 258 is also configured to provide an alternative path to the user for modifying the first parameter and the second parameter so that the first KPI and the second KPI remain within the predetermined threshold.

Figure 4:
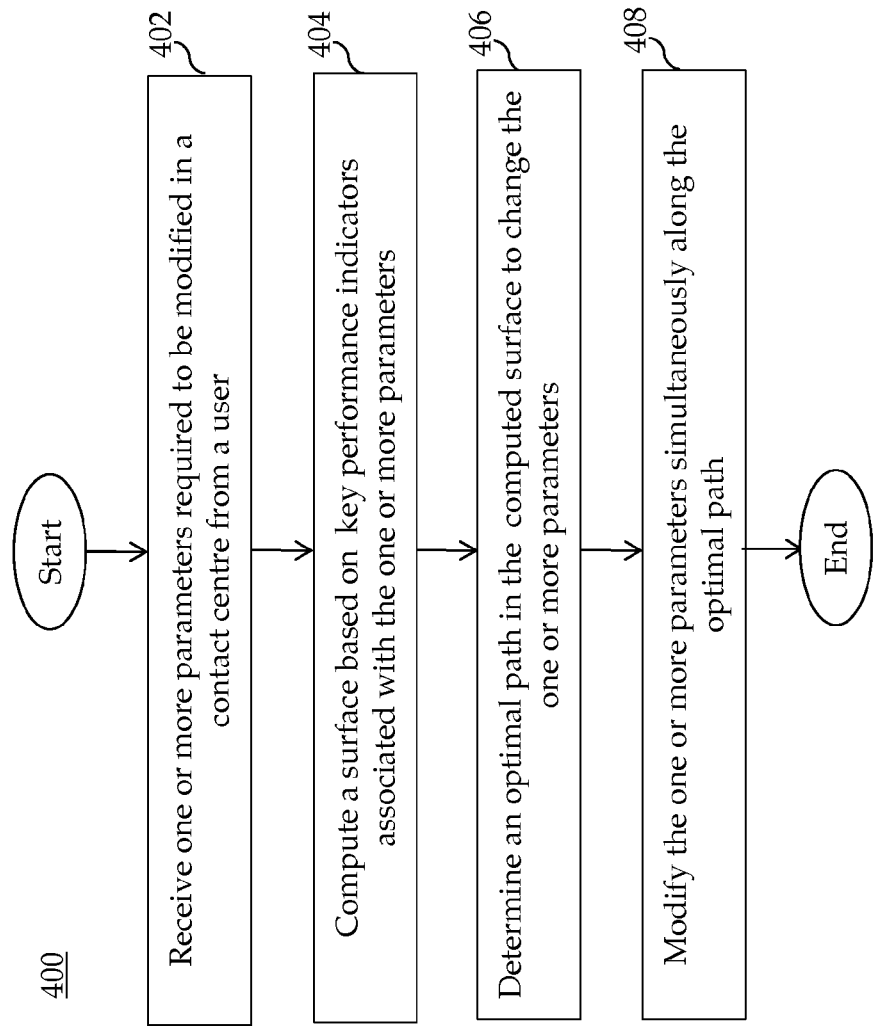
FIG. 4 is a flowchart of a method for modifying parameters in a contact center, in accordance with an embodiment of the present invention.

FIG. 4 is a flowchart of a method for modifying parameters in a contact center. At step 402, one or more parameters (e.g., N parameters) that are required to be modified in the contact center are received from a user. The parameters may include, but not limited to, specific attributes of agents, number of calls requiring specific skill set, number of agents with specific attribute, etc. Further, change of a parameter may affect one or more KPIs associated with the service level agreement. The KPIs may include, but not limited to, average wait time, total revenue, number of calls resolving issue in first call, etc. Each KPI may depend on one or many parameters. In an embodiment of the present invention, the input module 252 may enable the user to enter the first parameter and the second parameter.

At step 404, a surface is computed based on key performance indicators (KPIs) associated with the one or more parameters. In an embodiment of the present invention, each of the KPIs may include a predetermined acceptable threshold. Further, each of the KPIs is a function of one or more parameters, and change of a parameter may affect one or more KPIs associated with the service level agreement to drop below the acceptable threshold. Further, each parameter may include a predetermined range that specifies a range of values within which the parameter can be changed. In an embodiment of the present invention, the predetermined ranges of each parameter may be selected by the contact center based upon optimum performance of KPIs. In another embodiment of the present invention, the user may also specify the ranges of the parameters. The predetermined range of a parameter may include a minimum value and a maximum value of the parameter. In an embodiment of the present invention, the surface may be computed by the determination module 254.

At step 406, an optimal path is determined in the computed surface. In an embodiment of the present invention, the optimal path may provide options for the user to change the one or more parameters so that KPIs associated with the one or more parameters remain within a predetermined threshold. For example, if two parameters are required to be modified in the contact center, then the optimal path is a straight line connecting minimum values of the first parameter and the second parameter, with maximum values of the first parameter and the second parameter. In another embodiment of the present invention, the optimal path is a curved line in the determined surface. In an embodiment of the present invention, the optimal path may be determined by the determination module 254.

At step 408, the one or more parameters (e.g., N parameters) are modified along the determined optimal path. In an embodiment of the present invention, the one or more parameters are simultaneously modified along the optimal path, so that one or more KPIs associated with the one or more parameters remain within the threshold. For example, if two parameters (a first parameter and a second parameter) are required to be modified, then a first KPI and a second KPI associated with the first parameter and the second parameter remain within a predetermined threshold based upon the modification of the first parameter and the second parameter along the optimal path. In an embodiment of the present invention, the first parameter and the second parameter may be modified by the modification module 256.

Further, according to an embodiment of the present invention, the modifications of the parameters may be automatically triggered along the optimal path based upon predefined operating conditions. The predefined operating conditions may include sudden influx of calls directed at a contact center or poor performance of a particular KPI.

Further, the user may be alerted about unusual current behavior of at least one KPI based upon historical data. The user may also be alerted that at least one KPI may go outside a predetermined threshold based upon a modification of a parameter by the user. Furthermore, an alternative path may be provided to the user for modifying the first parameter and the second parameter so that the first KPI and the second KPI remain within the predetermined threshold.

The exemplary systems and methods of this present invention have been described in relation to a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example, in one alternative embodiment, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A parameters modification system in a contact center, comprising:
 a processor coupled to a memory, the memory configured to store instructions that, when executed by the processor, provide:
 an input module configured to enable a user to provide an input indicating one or more parameters required to be modified;
 a determination module configured to determine a surface based on key performance indicators (KPIs) associated with the one or more parameters, the determination module further configured to determine an optimal path in the determined surface; and
 a modification module configured to modify the one or more parameters along the determined optimal path.

2. The parameters modification system of claim 1, wherein the one or more parameters comprises a first parameter indicating a percentage of calls directed to an outsourcer.

3. The parameters modification system of claim 2, wherein the one or more parameters comprises a second parameter indicating number of agents having a particular skill-set.

4. The parameters modification system of claim 3, wherein a first key performance indicator and a second key performance indicator associated with the first parameter and the second parameter respectively remain within a predetermined threshold based upon the modification of the first parameter and the second parameter along the optimal path.

5. The parameters modification system of claim 4, wherein the optimal path is a straight line connecting initial values of the first parameter and the second parameter, and final values of the first parameter and the second parameter based upon the predetermined ranges.

6. The parameters modification system of claim 4, wherein the optimal path is a curved line in the determined surface.

7. The parameters modification system of claim 1, wherein the modification module simultaneously modifies the one or more parameters in their predetermined ranges along the optimal path.

8. The parameters modification system of claim 1, wherein the user is a supervisor.

9. The parameters modification system of claim 1, wherein the modification module is configured to take permission from the user before modifying the one or more parameters.

10. The parameters modification system of claim 1, wherein the modification module is further configured to automatically trigger modifications of the one or more parameters along the optimal path based upon predefined operating conditions of the contact center.

11. The parameters modification system of claim 1, further comprising an alert module configured to alert the user about unusual current behavior of at least one key performance indicator based upon historical data.

12. The parameters modification system of claim 11, wherein the alert module is configured to alert the user that one or more key performance indicators may go outside a predetermined threshold based upon a modification of the one or more parameters by the user.

13. The parameters modification system of claim 12, wherein the alert module configured to provide an alternative path to the user for modifying the one or more parameters so that the one or more key performance indicators associated with the one or more parameters remain within the predetermined threshold.

14. The parameters modification system of claim 1, wherein predetermined ranges of the one or more parameters are provided by the user.

15. A computer-implemented method for modifying parameters in a contact center, the computer-implemented method comprising:
    receiving one or more parameters required to be modified from a user;
    computing a surface based on key performance indicators (KPIs) associated with the one or more parameters;
    determining an optimal path in the determined surface; and
    modifying the one or more parameters along the determined optimal path.

16. The computer-implemented method of claim 15, wherein one or more key performance indicators associated with the one or more parameters remain within a predetermined threshold based upon the modification of the one or more parameters along the optimal path.

17. The computer-implemented method of claim 15, wherein the modifying comprises automatically triggering the modifications of the one or more parameter along the optimal path based upon predefined operating conditions.

18. The computer-implemented method of claim 15, further comprising alerting the user about unusual current behavior of at least one key performance indicator based upon historical data.

19. The computer-implemented method of claim 15, further comprising alerting the user that at least one key performance indicator may go outside a predetermined threshold based upon a modification of the one or more parameters by the user.

20. A non-transitory computer readable medium storing computer readable instructions that, when executed by a processor, perform a method comprising the steps of:
    receiving one or more parameters required to be modified from a user;
    computing a surface based on key performance indicators (KPIs) associated with the one or more parameters;
    determining an optimal path in determined surface; and
    modifying the one or more parameters along the determined optimal path.

* * * * *